United States Patent [19]

Rawlings

[11] Patent Number: 4,469,646

[45] Date of Patent: Sep. 4, 1984

[54] METHOD OF MOLDING PLASTIC CONTACT LENSES

[76] Inventor: David L. Rawlings, 33 E. Slope Rd., Bayville, N.Y. 11709

[21] Appl. No.: 406,503

[22] Filed: Aug. 9, 1982

[51] Int. Cl.$^3$ .............................................. B29D 11/00
[52] U.S. Cl. ...................................... 264/2.2; 264/1.1
[58] Field of Search ........................... 264/1.1, 2.2, 2.3

[56] References Cited

U.S. PATENT DOCUMENTS

| | | | |
|---|---|---|---|
| 3,056,166 | 10/1962 | Weinberg | 264/2.2 |
| 3,761,208 | 9/1973 | Boudet et al. | 264/2.2 |
| 4,008,031 | 2/1977 | Weber | 264/2.2 |
| 4,208,364 | 6/1980 | Shepherd | 264/2.2 |
| 4,284,591 | 8/1981 | Neefe | 264/1.1 |
| 4,364,878 | 12/1982 | LaLiberte | 264/2.2 |

Primary Examiner—James B. Lowe
Attorney, Agent, or Firm—Cushman, Darby & Cushman

[57] ABSTRACT

Plastic contact lenses are formed in a casting process in which the required amount of lens-forming material is charged into a mold half, the mating lens half is inserted but only far enough to contact at least the surface of the lens-forming material. Next the inserted part is allowed to dwell or is slowly withdrawn for a sufficient distance to cause the liquid lens-forming material to move to the center of the two molding surfaces and to approximate a column between the two molding surfaces. The moveable mold portion is then quickly inserted into the mold pushing the lens-forming material uniformly outwardly and displacing any air between the two molding surfaces to form a contact lens devoid of air bubbles and entrained air.

7 Claims, 4 Drawing Figures

METHOD OF MOLDING PLASTIC CONTACT LENSES

This application relates to procedure for molding plastic contact lenses from a lens-forming mixture of polymer or polymer precursors using an assemblable/-disassemblable mold.

Spherical contact lenses may be prepared by a casting method in order to reduce or eliminate machining and hand polishing of the lens; this is described in U.S. Pat. No. 4,121,896 issued Oct. 24, 1978 in the name of T. H. Shepherd. According to the process there described, male and female mold members are prepared from a thermoplastic composition by injection molding. These plastic mold parts are then used to mold spherical corneal contact lenses. In these molds one of the mold surfaces is provided with a integral, flexible circumferential ring; this ring defines the periphery of the resulting lens. The material which will constitute the lens is charged between the two mold parts, the mold parts are contacted and, during molding, the molding material contracts causing the two mold portions to move towards each other. Once molding is completed the mold parts are separated and the resulting contact lens is removed in a condition for use except for possible optional cleaning and polishing of the lens edges.

While this procedure is both efficient and economical, there are some instances in which the resulting contact lens contains entrapped air bubbles, dust or the like which renders the lens unsuitable for use. One of the objects of my invention is to reduce dramatically the occurrence of these air bubble-containing lenses and to provide a process that efficiently and quickly molds contact lenses free from air bubbles and the like.

BRIEF DESCRIPTION OF THE DRAWINGS

The drawings are all cross-sectional views of two mold halves depicted in various stages of the process.

BRIEF DESCRIPTION OF THE INVENTION

My invention includes a process for molding plastic contact lenses using a contact lens mold assembly consisting of two mold halves or portions; molds are described in more detail below. Mold portions, cleaned of any lint or dust, are used. The requisite amount of the liquid lens-forming material is dispensed onto the optical surface of the female mold portion. The amount introduced is such that the flexible rim of the male mold when finally seated on the optical surface of the female mold portion will define a closed space between the mold portion in the shape of the lens desired, and a slight excess of the material will be forced out of this closed space and travel upwardly along the "annulus" which is defined by the two mold halves.

Figure 3:
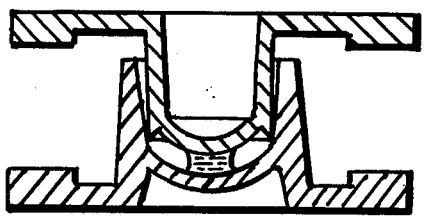
In FIG. 3 the male portion, after having touched the lens-forming material, is allowed to dwell or is slowly raised; this draws the lens-forming material towards the center of the two mold halves into a configuration generally in the shape of a column with the sides of the center portion of the column converging.

The next step in the operation is to introduce the male mold portion into the female mold portion until the lens-forming surface barely touches the lens-forming material. The male mold portion is allowed to dwell or is slowly raised which causes the lens-forming material to be drawn towards the axial center of the two mold portions generally in the shape of a column as illustrated in FIG. 3. Care must be taken not to withdraw the male mold portion to such an extent that the column of lens-forming material is broken.

After arranging the lens-forming material in a column in the center of the two mold portions the male mold portion is quickly pushed down and it appears that the lens forming mixture, driven outwardly as a circular wave front pushes air uniformly out followed by the excess amount of lens-forming material. The excess amount of lens-forming material is driven out from the enclosed space and is displaced to the annular space between the two mold portions. The distance which the male mold portion is driven downwardly is such that the flexivle rim attached to the optical surface will be properly seated and flexed inwardly onto the opposite optical surface. Unexpectedly and surprisingly, indeed, no bubbles are apparent in the lens-forming material which is contained in a totally enclosed space defined by the optical mold surfaces of the male and female mold portions and the flexible rim on one of the mold surfaces, usually the male mold surfaces. The lens-forming material in the closed mold assembly is then subjected to activating conditions for a period of time sufficient to produce a contact lens. The two mold portions are separated and the finished lens is released. By the practise of the invention there can be obtained extremely thin leses; e.g., lenses having a center thickness of 0.04 mm.

Successful operation of the process is not dependent upon the type or configuration of the molds employed provided the basic principles of the invention are obeyed, that is as long as the lens-forming material is drawn together in the center between two mold portions and then quickly distributed into the totally enclosed space that will form the lens while at the same time displacing air that surrounds the lens-forming material. A suitable mold configuration and the type specifically illustrated in the drawings of this application is contained in U.S. Pat. No. 4,121,896 to T. H. Shepherd, identified above. Another suitable arrangement includes a tensioning means on the female mold portion so as to distort the molding surface of one of the mold portions and result in a toric optical surface on the finished lens. This is the subject of U.S. Pat. No. 4,208,365 issued to Robert J. LeFevre. If the finished lens is to have a toric surface it is desirable to employ a mold portion, preferably the female mold portion, which has a predetermined toric optical surface. For example, prism ballast may be accomplished when the male mold portion is in a "tilted" relationship with respect to the female mold portion. In other words, the said axis of the female portion and the said axis of the male portion are not coincident. The is the subject of copending application Ser. No. 199,780 filed Oct. 23, 1980 the disclosure of which is hereby incorporated by reference.

To produce truncated contact lenses it is convenient to use a mold consisting of a male portion, a female portion and one of the optical molding surfaces of either the male or female portion having a continuous, flexible rim around integral with the molding surface. The rim is essentially circular but has a portion interrupted by a straight line. The circular portion of this rim has an axis common with the principle longitudinal axis of the mold portion to which it is attached and a straight line connects two ends of the continuous, flexible rim defining a cord. This is disclosed in copending application Ser. No. 266,782 filed May 26, 1982 in the name of Henry Haardt et al now U.S. Pat. No. 4,407,766. The disclosures of the above-listed patents and applications are hereby incorporated by reference.

Toric lenses comprise two basic parts, that is a cylinder to correct astigmatism of the eye and prism ballast for insuring positional stability when the contact lens is placed on the cornea. Non-astigmatic lenses do not have such a requirement and the lens is allowed to rotate freely on the layer of tears carrying it. Toric lenses, on the other hand, require proper, rather precise, positioning on the eye. One procedure used to achieved lens stability is to remove a small portion, typically from 1 to 1.5 mm, of an outer cord of the contact lens which itself is usually about 14 mm in diameter. This is called truncation; opposed parallel clippings are double truncations. Another means of achieving positional stability for a toric contact lens is to provide a somewhat larger mass of plastic material at or proximate an edge of the lens so that, in use, when the lens rotates the heavier edge will gravitate towards the bottom of the axis of rotation, namely the lower eye lid, to serve to stabilize the lens on the eye. This is known in the art as prism ballast.

The process of the present invention is particularly suited for molds to make plastic contact lenses which molds have a flexible rim construction, that is a flexible rim around the periphery of the closed space that defines the edge of the finished contact lens. Molds of this type are disclosed and described, for example, in U.S. Pat. Nos. 4,208,356 and 4,208,364, the disclosures of which are fully incorporated by reference as if set out in full text.

DETAILED DESCRIPTION OF THE DRAWINGS

Figure 1:
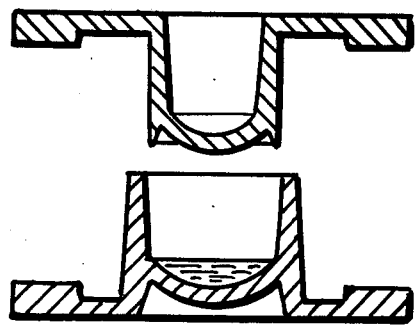
FIG. 1 shows the male mold portion approaching rapidly the female mold portion containing the requisite amount of lens-forming material.

FIG. 1 is a cross-sectional view of two mold halves in which the male portion rapidly approaches the female portion to which has been added the requisite amount of lens-forming material. The required amount of lens-forming material is conveniently determined through a series of experiments in which one measures the amount of material required to form the desired lens and also to provide an additional amount of material for displacement from the enclosed space (defined by the optical mold surfaces and the flexible rim on the male mold surface) and travel up the annulus between the two mold halves but without overflowing the top.

Figure 2:
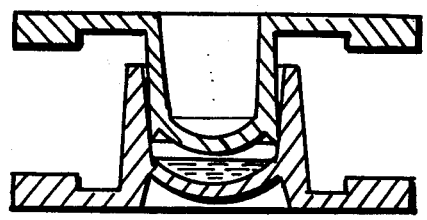
FIG. 2 shows the male mold portion stopped in its downward motion as the optical surface of the male mold portion, which will form the base curve of the finished lens, touches the lens-forming material.

In FIG. 2, as the procedure goes forward, the male mold portion is inserted into the female mold portion until the optical surface of the male mold portion touches and is in contact with the meniscus of the lens-forming material retained in the female portion of the mold. Without wishing to be bound to any particular theory or mode of operation, it would appear that the optical surface of the male portion breaks the surface tension of the lens-forming material and allows it to be drawn up from a horizontal surface layer into a shaped column, as discussed below.

Figure 4:
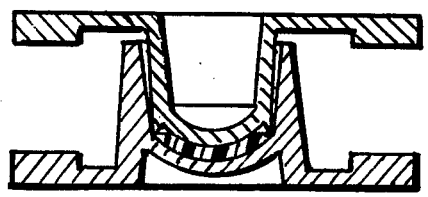
FIG. 4 shows the male portion as it is quickly pushed down into the female mold portion causing the lens-forming mixture to be driven uniformly outwardly from the two lens-forming surfacing carrying with it any excess air. Excess lens-forming mixture is driven outwardly from the enclosed space along the annulus of the two mold halves when positioned together.

Once in contact with the lens-forming material the male portion is allowed to dwell or is slowly withdrawn and raised. This causes the len-forming material to be drawn to the center of the two mold halves generally in the shape of a column, although the sides midway between the two optical surfaces tend to converge in this column. This serves to centralize the "shot" of lens-forming material in the two mold halves and allows for displacement of air and proper spread of the lens-forming material in the next operational step. Care must be taken not to raise the male mold member too far and break the column. FIG. 4 shows the two mold halves that have been quickly placed together. In this procedure the male portion is quickly pushed down and the lens-forming mixture is driven uniformly outwardly displacing any air between the two mold halves and eventually displacing the excess quantity of lens-forming material.

The amount of pressure applied to the two mold halves once they are in the configuration of FIG. 4 depends on the molds themselves. Typically an amount of pressure will be applied sufficient to cause inward flexing of the circumferetial ring on the male mold half, if this is the particular mold arrangement employed. It will also be understood that it is possible to tilt the male mold portion with respect to the female portion in order to achieve prism ballast for the resulting lens. In this arrangement the principle longitudinal axis of the male mold portion is not coincident with the principle longitudinal axis of the female mold portion. In this aspect of the invention a mold assembly is used comprised of two lens-forming mold members, one such mold member having an optical concave toric molding surface and a principal longitudinal axis of curvature, a second such mold member having an optical convex molding surface and a principal longitudinal axis of curvature. These two longitudinal axes of curvature form an angle when the said mold members are in lens-forming relationship with each other.

Using this type of mold assembly the four basic steps described above and illustrated in the drawings are followed. The mold assembly is closed such that the second mold portion is in a lens-forming relationship with the first mold portion forming an angle $\theta$ with respect to the principal longitudinal axes of curvature of each of the molding surfaces. Angle $\theta$ does not exceed 20°. Then the lens-forming material is subjected to activating conditions for a period of time sufficient to produce a contact lens characterized by a front optical convex toric surface, a back optical concave surface, and significant positional stability when in use as a contact lens.

A multi-component molding system having either the male portion or the female portion or both fabricated of flexible material, e.g., thermoplastic material is preferred. Both the male portion and female portion are provided with an optical molding surface, e.g., spherical, which have a predetermined curvature. Toricity may also be included in one of the molding surface, that is the mold portion that provides the optical surface (as contrasted with the base curve) of the finished lens. As stated above, in this embodiment of the invention the principal longitudinal axis of curvature of each molding surface is not coincidental or in alignment but rather forms an angle termed θ. For convenience, the principal longitudinal axis of curvature with respect to the female molding surface (a principal longitudinal axis which can be considered, for convenience and ready reference, to be the ordinate or "y" axis) is maintained fully perpendicular to two axes which are tangent to the base or apex of the female molding surface; each of these two axes are perpendicular to each other and in the same plane. The two axes can be considered to be the "x" axis (abscissa) and the "z" axis. The principal longitudinal axis of curvature of the male molding surface would involve the corresponding axes (which, for convenience, can be designated as the y′, x′ and z′ axes). Thus the angle θ represents the deviation from alignment of these two principal longitudinal axes (y and y′), one of which is maintained fully perpendicular, as noted above, and the other being oblique.

The angle θ, in effect, defines the amount of prism ballast which is traditionally measured in diopters and which is imparted to the toric lens produced by the practice of the invention. Broadly, this angle θ can range up to about 15 to 20 degrees, but is generally up to about 10°. From a commercial standpoint it is desirable to maintain angle θ within the range of about 2° to about 8°, preferably about 3° to about 6°.

Typically the male mold portion is provided with a substantially cylindrical support segment having the optical molding surface attached circumferentially around the lower portion of the support segment. The female portion, in preferred embodiments, is provided with a hollow cylindrical support segment having the optical molding surface attached circumferentially around its base.

The molds employed may have spherical surfaces or the relevant mold portion may have a toric optical surface as such in it. Other arrangement include tensioning the lower or female portion to give the optical surface the required toricity; toric lenses are the subject inter alia of U.S. Pat. No. 4,208,365.

Also contemplated within the present invention are runoff channels for the mold portions to provide a means for excess lens-forming material to be removed from between the sides of the two mold portions.

During the molding operation the lens-forming material may itself contract, depending upon the material employed. Contraction on the order of as much as 20% in volume is not unusual. Usually a slight external pressure is applied to the assembled mold halves, desirably on the male mold portion, to insure proper inward flexing of the integral rim and that the molding surfaces do remain in contact with the lens-forming material during contraction of same.

After the molding operation is completed the two mold halves are separated and the resulting lens is removed from the mold in a condition ready for use, although if desired the lens may be cleaned and the edges buffed.

The novel process of the present invention has many advantages over prior art methods in that the desired plastic contact lens is cast directly from the lens-forming material. Generally polishing of the optical surfaces is not required and if at all only a minimum finish of the lens edges may be required. The overall manufacturing operation is far less labor-intensive than with prior procedures, typically those using a lathe. The present invention enjoys the advantage of dependably and faithfully reproducing a number of plastic contact lenses that are free from air bubbles, distortions and the like induced during the molding operation.

The design of the lenses produced by the invention is not restricted to any particular set of parameters. Both anterior and posterior optical surfaces of the lenses may consist of aspherical curves. The central portion of the lens may consist of spherical curves on either or both the naterior and posterior surface, and the periphery of the anterior surface may consist of a steeper or flatter spherical curve, and the periphery of the posterior surface may be aspheric to achieve a combination of improved fitting characteristics.

EXAMPLE

A contact lens is formed as follows: 40 microliters of a lens-forming material is placed on the optical surface of the female mold portion whose radius is 7.30 mm. The radius of the optical surface of the male mold portion is 7.18 mm. The optical surfaces are generally spherical and at the completion of the molding operation will yield contact lenses having a center thickness of about 0.04 mm and a diameter of about 11.98 mm.

In operation the male mold portion is brought down rapidly until it barely touches the surface of the lens forming material. Next the male mold portion is slowly pulled away from the female mold portion upwardly at a rate of 0.2 inch/sec. to a height of about 0.025 inches. This causes the lens-forming material in the mold assembly to be drawn inwardly and to form a "column" in the center of the mold. Care is taken not to withdraw the male mold portion to such an extent that the integrity column of the lens-forming material is destroyed. Once withdrawn to its optimum height the male mold portion is driven downwardly at approximately 0.07 inch/sec. under a force of two pounds into the female mold portion causing the air and the lens-forming material to push outwardly. The distance which the male mold portion is driven downwardly is such that the flexible rim attached to the optical surface will be properly seated and flexed inwardly on the opposite optical surface, in this case of the female mold.

Using this procedure consistent contact lenses are produced which bubble formation and other defects in the resulting contact lenses are substantially reduced.

Any lens-forming material can be employed in the novel process to fabricate contact lenses. Such materials are generally viscous and adherent at operational temperatures. They may be hydrophilic, or hydrophobic, or mixtures of both. The resulting contact lenses may be hard lenses as exemplified by the rigid acrylic plastics, most notably poly(methyl methacrylate); or such contact lenses may be flexible, hydrophobic lenses as exemplified by the unsubstituted and fluoro-substituted polyethylenes, the silicone elastomers, and the like; or such contact lenses may be the so-called hydrophilic lenses desirably having a three-dimensional structure such as polymers of 2-hydroxyethyl methacrylate (HEMA), various hydrolyzed hydrophilic collagen products, and the like. The hydrophilic lenses are water-insoluble, water-swellable, and when immersed in water or saline solution swell to attain their final dimensions. The resulting water-swollen lenses may be properly termed hydrogel lenses.

Monomer, prepolymer or vulcanizable mixtures particularly useful in the practice of this invention include hydrophobic acrylic esters, suitably lower alkyl acrylic esters, the alkyl moiety containing 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or various mixtures of these monomers. For increased dimensional stability and resistance to warpage the above monomers or monomer mixtures may be further admixed with a minor proportion of di- or polyfunctional polymerizable species to cause cross-linking of the polymeric matrix as polymerization proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanol amine, glycerol, pentaerythritol, butylene glycol, diethylene glycol, triethylene glycol, tertraethylene glycol, mannitol, sorbitol and the like. Other cross-linking monomers may include N,N-methylene-bis-acrylamide or methacrylamide, sulfonated divinylbenzene, and divinyl sulfone.

Further, the above monomers or mixtures thereof may be further mixed with linear polymeric species which are soluble therein as long as the viscosity of the solution or "casting syrup" formed thereby does not become sufficient great that difficulty in removing bubbles therefrom is encountered.

Other monomeric materials suitable for producing lenses via this invention are hydrophilic monomer mixtures forming three dimensional cross linked networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkjyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl-substituted N-vinylpyrrolidone; glycidyl methacrylate; glycidyl acrylate; and others known to the art. Also useful are the alkyl ether acrylates and methacrylates and the vulcanizable silicone fluids or elastomers. The alkyl moieties which are especially suitable in the aforementioned compounds are those which contain from 1 to 5 carbon atoms therein.

With the hydrophilic monomer or mixtures thereof, it is preferred that a 3-dimensional cross linked network be formed. For this purpose it is desireable to employ small amounts of crosslinking monomers such as those illustrated above with respect to the discussion on hydrophobic acrylic esters or other cross-linking technique, e.g., radiation.

Preferred monomeric mixtures contain at least one alkylene glycol monoester of methacrylic acid, especially ethylene glycol monomethacrylate, and at least one crosslinking monomer such as the alkylene glycol ester of methacrylic acid, especially ethylene glycol dimethacrylate. Such mixtures may contain other polymerizable monomers, desirably in minor amounts such as N-vinlypyrrolidone, methyl methacrylate, acrylamide, N-methacrylamide, diethylene glycol monomethacrylate, and others illustrated above.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent, if employed, can comprise a minor amount of the reaction medium, i.e., less than about 50 weight percent.

Polymerication of monomer mixtures is usually carried out with free radical catalysts of the type in common use in vinyl polymerization. Such catalyst species include organic peroxides, percarbonates, hydrogen peroxides, and inorganic materials such as ammonium, sodium, or potassium persulfate. Polymerization using such catalysts may occur at temperatures between ambient temperature, that is about 20° C. to about 120° C., depending on the speed of polymerization desired.

Polymerization may also occur between monomer or prepolymer mixtures under the influence of elevated temperatures or radiation (U.V., X-ray, or other well-known forms of radioactivity).

With silicone elastomers, vulcanization may take place via a free radical curing mechanism, or, in the case of two part so-called RTV compounds, vulcanization may occur through displacement or condensation reactions. Patents which further illustrate lens-forming materials useful in the preparation of contact lenses include, by way of examples, U.S. Pat. No. Re 27,401; U.S. Pat. Nos. 3,539,524; 3,699,089; 3,700,761; 3,822,089; 4,121,896; 4,208,365; and 4,223,984; the full disclosures of which are incorporated by reference as if set out in full text.

What is claimed is:

1. A process for casting a plastic contact lens from a polymerizable mixture in a closed mold system composed of a first molding portion having a principal longitudinal axis including a predetermined molding surface to form a first surface of the desired contact lens, a second molding portion having a principal longitudinal axis including a predetermined molding surface to form a second surface of the desired contact lens, one surface having a flexible rim about the circumference of one of the optical surfaces in coaxial alignment with said principal longitudinal axes said process comprising the steps of:
   (1) charging a quantity of lens-forming material into the first molding portion of the mold system in an amount at least sufficient to form the plastic contact lens desired;
   (2) inserting the second molding portion of the mold system into the first molding portion until the second molding portion contacts the surface of the lens-forming material;
   (3) dwelling or withdrawing the second molding portion slowly away from the first molding portion until the lens-forming material in contact with the optical surfaces approximates the shape of a column in the area of said principal longitudinal axes; and thereafter
   (4) quickly pushing down the second molding portion into the first molding portion thereby displacing air from between the two mold portions and uniformly distributing the lens-forming material substantially devoid of air bubbles between the two molding surfaces of the two molding portions to form a totally enclosed space between the two molding surfaces;

(5) applying pressure to the positioned and closed molding portions causing the circumferential rim defining the edge of the resulting contact lens on one of the molding surfaces seat against the opposite molding surface and to flex inwardly.

2. A process for casting a contact lens from a polymerizable lens-forming mixture in a closed mold system which includes:

(i) a male mold portion including a substantially cylindrical support having a principal longitudinal axis and a base curve molding surface attached circumferentially to the cylinder support, the base curve molding surface having a predetermined curvature to form the base curve surface of the resulting contact lens;

(ii) a flexible, thermoplastic female portion comprising a hollow cylindrical portion having a principal longitudinal axis and having an open upper end and a closed lower end, the internal diameter of the female cylinder portion being sufficiently greater than the external diameter of the male support portion to allow the male support member to be insert therein, the female portion being circumferentially closed at the lower end thereof by an intergral optical curve molding surface having a curvature to form the optical curve surface of the resulting contact lens; and (iii) an intergral rim portion flexible inwardly towards the axis of both of the molding surfaces attached circumferentially to, and integral with, one of the molding surfaces and having an axis common with the principal longitudinal axis of the mold portion;

said process including the sequential steps of:

(a) charging a flowable, polymerizable lens-forming material onto the molding surface of the female portion of the mold;

(b) aligning the two mold portions then inserting the male mold portion until the molding surface contacts the surface of the lens-forming material retained in th female portion of the mold;

(c) withdrawing the male mold portion slowly away from the female portion thereby causing the flowable lens-forming material between the two molding surfaces to withdraw to the center of the molding surfaces of the two mold portions and form a column substantially about the principal longitudinal axis of each of the mold portions;

(d) closing the mold by slidably engaging the cylindrical portion of the female portion and seating the flexible rim circumferentially on the opposite molding surface thereby displacing any air present from between the two molding surfaces while distributing the retaining the lens-forming material between the molding surfaces and the flexible rim portion to form a totally enclosed space therebetween substantially completely devoid of air;

(e) applying pressure to the closed mold of step (d) to urge the molding surfaces towards each other and cause the rim portion to flex inwardly in a uniform manner with respect to the principal longitudinal axis of each of the mold portions;

(f) subjecting the closed mold to polymerization conditions causing the lens-forming material to polymerize; and (g) removing the thus molded contact lens from the mold.

3. The process of claim 1 in which the first and second molding portions are adjusted so that the angle $\theta$ defined by the two longitudinal axes is in the range of about 2° to about 8°.

4. The process of claim 3 in which the angle $\theta$ is in the range of from about 3° to about 6°.

5. The process of claim 2 in which the flexible rim is integral with the male mold portion.

6. The process of claim 1, 2 or 3 in which the lens-forming material comprises a 2-hydroxyethyl methacrylate (HEMA).

7. The process of claim 1, 2 or 3 in which the lens-forming material comprises N-vinylpyrrolidone.

* * * * *